US012583986B2

(12) United States Patent　(10) Patent No.: US 12,583,986 B2
Nuyts et al.　(45) Date of Patent: Mar. 24, 2026

(54) DECORATIVE PANEL AND METHOD FOR MANUFACTURING DECORATIVE PANELS

(71) Applicant: Flooring Industries Limited, SARL, Bertrange (LU)

(72) Inventors: Joren Nuyts, Wielsbeke (BE); Sara Vanhaverbeke, Wielsbeke (BE); Benjamin Clement, Wielsbeke (BE)

(73) Assignee: UNILIN, BV, Wielsbeke (BE)

( * ) Notice: Subject to any disclaimer, the term of this patent is extended or adjusted under 35 U.S.C. 154(b) by 128 days.

(21) Appl. No.: 18/407,592

(22) Filed: Jan. 9, 2024

(65) Prior Publication Data

US 2024/0228716 A1　Jul. 11, 2024

Related U.S. Application Data

(60) Provisional application No. 63/438,107, filed on Jan. 10, 2023.

(51) Int. Cl.
B32B 3/30　(2006.01)
B32B 3/06　(2006.01)
(Continued)

(52) U.S. Cl.
CPC .............. C08J 7/0423 (2020.01); B32B 3/06 (2013.01); B32B 3/30 (2013.01); B32B 5/18 (2013.01); B32B 27/065 (2013.01); B32B 27/08 (2013.01); B32B 27/20 (2013.01); B32B 27/304 (2013.01); B32B 37/24 (2013.01); C08J 9/365 (2013.01); C09D 1/00 (2013.01); C09D 5/002 (2013.01); E04F 15/105 (2013.01); E04F 15/107 (2013.01); B32B 2037/243 (2013.01); B32B 2255/10 (2013.01); B32B 2255/26 (2013.01); B32B 2264/10

(2013.01); *B32B 2266/0214* (2013.01); *B32B 2307/4023* (2013.01); *B32B 2307/406* (2013.01); *B32B 2307/538* (2013.01); *B32B 2307/554* (2013.01); *B32B 2307/72* (2013.01); *B32B 2307/7376* (2023.05); *B32B 2607/00* (2013.01); *C08J 2327/06* (2013.01); *C08J 2463/10* (2013.01); *C08J 2467/06* (2013.01); *C08J 2471/02* (2013.01); *C08J 2475/14* (2013.01); *C08J 2483/07* (2013.01); *E04F 15/02038* (2013.01); *E04F 2201/023* (2013.01); *E04F 2201/042* (2013.01); *E04F 2201/043* (2013.01)

(58) Field of Classification Search
CPC .................................. B32B 3/30; B32B 3/263
See application file for complete search history.

(56) References Cited

U.S. PATENT DOCUMENTS 12,116,786 B2　10/2024　Van Vlassenrode et al.
2023/0025597 A1 *　1/2023　Akutsu .................... B44C 5/04
(Continued)

FOREIGN PATENT DOCUMENTS

| EP | 2154184 A1 | 2/2010 |
| EP | 2883712 A1 | 6/2015 |
| EP | 3677347 A1 | 7/2020 |
| EP | 4094934 A1 | 11/2022 |
| EP | 4101640 A1 | 12/2022 |
| WO | 9747834 A1 | 12/1997 |
| WO | 2011077311 A2 | 6/2011 |
| WO | 2013026559 A2 | 2/2013 |
| WO | 2021094625 A1 | 5/2021 |

*Primary Examiner* — Elizabeth E Mulvaney
(74) *Attorney, Agent, or Firm* — Workman Nydegger

(57)　ABSTRACT

A decorative panel includes a substrate, a top layer and a top coating. The top layer is located between the substrate and the top coating. The uppermost surface of the top coating includes a randomized relief.

18 Claims, 4 Drawing Sheets

(51) Int. Cl.

| | |
|---|---|
| *B32B 5/18* | (2006.01) |
| *B32B 27/06* | (2006.01) |
| *B32B 27/08* | (2006.01) |
| *B32B 27/20* | (2006.01) |
| *B32B 27/30* | (2006.01) |
| *B32B 37/24* | (2006.01) |
| *C08J 7/04* | (2020.01) |
| *C08J 9/36* | (2006.01) |
| *C09D 1/00* | (2006.01) |
| *C09D 5/00* | (2006.01) |
| *E04F 15/10* | (2006.01) |
| *E04F 15/02* | (2006.01) |

(56) References Cited

U.S. PATENT DOCUMENTS

| | | | |
|---|---|---|---|
| 2023/0041625 A1* | 2/2023 | Oshima | B44C 3/02 |
| 2023/0107500 A1* | 4/2023 | Baert | E04F 15/107 |
| | | | 428/172 |
| 2023/0115940 A1* | 4/2023 | Baert | E04F 15/102 |
| | | | 52/130 |
| 2025/0033083 A1* | 1/2025 | Symkens | B44F 1/02 |

* cited by examiner

DECORATIVE PANEL AND METHOD FOR MANUFACTURING DECORATIVE PANELS

BACKGROUND

The present invention relates to decorative panels and methods for manufacturing decorative panels. The decorative panels of the invention are in the first place destined for application as floating floor panels, but may also be applied otherwise. For example as glued down floor panels, or as wall or ceiling panels.

In particular, the invention relates to decorative panels, for which laminate floor panels, parquet floor panels, and floor panels based on synthetic material are known examples. More in particular, in the class of floor panels which are based on synthetic material, LVT, WPC, and SPC floor panels are known examples. These floor panels mostly have a thermoplastic substrate, which, apart from the thermoplastic synthetic material, may also comprise additives and/or fillers. The top layer of these floor panels mostly also is composed of one or more thermoplastic layers. Reference is made to document WO 2013/026559 for an exemplary composition of such product.

Similarly to laminate floor panels, it is the intention that these synthetic material-based floor panels comprise an upper surface reflecting a natural character, in particular with respect to visual appearance and haptics. To this aim, use is generally made of a decor and an embossed wear layer, by which a relief is realized in the upper surface of the floor panel. Again, reference is made to document WO 2013/026559, in which such example is described.

Decorative panels as known in the art, may however have the disadvantage of still having a substantially synthetic look and/or feel. While advances have already been made with regard to the quality of the decorative print, the structural look and/or feel still leaves a lot to desire in light of providing a more natural appearance.

SUMMARY

The prime object of the present invention is to provide an alternative decorative panel, with various preferred embodiments offering a solution for one or more of the problems associated with the decorative panels of the state of the art.

A first independent aspect of the present invention is a decorative panel comprising a substrate, a top layer and a top coating, wherein said top layer is located between said substrate and said top coating, and wherein the uppermost surface of said top coating comprises a relief, preferably a randomized relief and/or a relief completely defined by a curing process.

In light of the present invention, the relief may be "randomized", which is to be interpreted as a relief which, at least partly, does not follow a predetermined pattern, in particular does not follow a predetermined repeating pattern. Alternatively or additionally, the relief may be completely defined by a curing process, which may form the relief in a substantially unpredictable way. In what follows, the wording "randomized relief" will be used as a general term encompassing all of these possibilities.

It is clear that said randomized relief is independent from any relief available at the surface of said top layer. It is noted that it is possible that said randomized relief is superposed on a relief that is available at the surface of said top layer. The randomized relief may for example be a micro-texture that is superposed on the relief that is available at the surface of said top layer.

The invention may have one or more advantages over what is known in that the randomized relief provides the panel with a more natural and/or authentic look and feel. More in particular, the decorative panel of the invention may have a less synthetic appearance in comparison to the panels as known in the art, and/or may look of higher quality.

By preference, said randomized relief comprises a plurality of peaks and valleys. It is noted that the terms "peak" and "valley" should be interpreted in relation to the average level of the uppermost surface of the panel, in particular of the top coating. As such, peaks are situated at a higher level than said average level of the uppermost surface of the panel, while valleys are situated at a lower level than said average level of the uppermost surface of the panel. In the cases where said randomized relief is superposed on a relief available in the surface of said top layer, said average level may be defined locally, i.e. by making abstraction from, or filtering out, any height differences essentially created by the relief available in the surface of said top layer. The decorative panel of the invention may have an uppermost surface which gives at least partly a less glossy and/or shiny impression, and/or which has a softer feel. In some embodiments, the presence of said peaks and valleys, in particular an alternating presence of said peaks and valleys, may give rise to a wrinkling effect on the uppermost surface of the panel, in particular of the top coating.

More by preference, said plurality of peaks and valleys are configured having an average peak-to-peak distance of between 1 and 25 μm. Within the described range, the uppermost surface of the decorative panel has a particularly advantageous look and/or feel, in that the uppermost surface looks homogeneously less glossy and/or shiny, and/or has a softer feel.

According to a further or another embodiment, said plurality of peaks and valleys are configured having an average amplitude of between 0.5 and 10 μm. The uppermost surface of the decorative panel may have a less glossy and/or shiny look, and/or may have a softer feel. The randomized relief may however not be visually perceived as an actual relief being present.

It is noted that the average peak-to-peak distance and average amplitude may be determined using confocal microscopy. More in particular, ISO 25178-2:2021 may be used to determine an array of surface texture parameters described herein.

According to a further or another embodiment, said plurality of peaks and valleys are configured having an average peak-to-peak distance of between 1 and 10 μm. According to still a further or another embodiment, said plurality of peaks and valleys are configured having an average amplitude of between 0.5 and 2.5 μm. Within the described ranges, the uppermost surface of the decorative panel may have a substantially soft feel to it, which may improve perceived walking comfort.

It is clear that, in accordance with the invention, said randomized relief and/or said plurality of peaks and valleys does not need to be, but can be, present over essentially the entire decorative part of the upper surface of said decorative panel. Preferably, said randomized relief and/or said plurality of peaks and valleys are at least available over 10 percent of the decorative part of the upper surface of said decorative panel, i.e. of that part of the upper surface that is visible in use. The mentioned geometrical properties of said plurality of peaks and valleys, such as the peak-to-peak distance and the average amplitude, may be determined by assessing the randomized relief linearly, i.e. by looking at the randomized relief in a cross-sectional plane perpendicular to said upper surface. Preferably said geometrical properties, i.e. the peak-to-peak distance and/or the average amplitude, is at least available over a distance of at least 1 mm, at least 10 mm, or at least over a distance of 100 mm, as seen in such cross-sectional plane. Such assessment over a linear distance may be performed by a suitable roughness measurement device, for example in accordance with ISO 4287:1997. For example, the average amplitude can be equaled to the Ra value as measured in accordance with ISO 4287:1997, and the peak-to-peak distance can be equaled to the base wave-length of the roughness profile. Similar equivalent parameter values can be used when conducting roughness measure-ments of a surface rather than over a linear interval. For example, the Sa value as measured in accordance with ISO 25178-2:2021 can be used as the average amplitude. Pref-erably such surface measurement is executed over an area of at least 0.5 mm$^2$, at least 1 mm$^2$, or at least 1 cm$^2$.

Said uppermost surface of said top coating, more particu-larly at the locations where said randomized relief is avail-able, according to some embodiments, has a gloss degree measured at an angle of 60° of below 6 points. By prefer-ence, e.g. at said locations, said uppermost surface of said top coating has a gloss degree measured at an angle of 60° of below 3 points. According to a further or another embodi-ment, said uppermost surface of said top coating has a gloss degree measured at an angle of 85° of below 12 points, for example at these locations where the randomized relief is available. By preference, said uppermost surface of said top coating has a gloss degree measured at an angle of 85° of below 8 points, for example at said locations where the randomized relief is available. It is noted that the gloss degree may be measured with a micro-TRI-gloss measuring device, for example provided by BYK-Garner, which con-forms to ISO 2813:2014.

Preferably, said top coating has a carbon-carbon double bond conversion degree of more than 80%. By preference, said top coating has a carbon-carbon double bond conver-sion degree of more than 90%. It is noted that the carbon-carbon double bond conversion degree may be measured using Fourier-Transform Infrared Spectroscopy (FTIR).

Preferably, said top coating comprises a polymeric mate-rial. By preference, said polymeric material is chosen from the group of polyester acrylates, polyether acrylates, epoxy acrylates, silicone acrylates, polyurethane acrylates, or a combination thereof.

Preferably, said top coating is free of matting agents or comprises less than 4% of matting agents. The decorative panel of the invention may thus have an uppermost surface, in particular the uppermost surface of the top coating, which has a less glossy and/or shiny appearance, and/or which has a softer feel, without the need for including matting agents in the top coating. According to some embodiments, when present in an amount of less than 4%, said matting agent may be chosen from the group of silica powder, wax powder, polyimide powder, or combinations thereof.

Said top coating, according to some embodiments, com-prises wear resistant particles. Said wear resistant particles may contribute in making the uppermost surface of the panel, in particular the uppermost surface of the top coating better wear resistant and/or durable. By preference, said wear resistant particles may be chosen from the group of aluminum oxide particles, silicon carbide particles, silicon oxide particles, diamond particles, or combinations thereof.

In some embodiments, said top coating may be present in an amount of between 5 and 30 g/m$^2$. Within the described range, said top coating may provide the uppermost surface of the panel with a less glossy and/or shiny appearance, and/or with a softer feel, meanwhile providing sufficient wear resistance to the uppermost surface of the panel. By preference, said top coating may be present in an amount of between 7 and 15 g/m$^2$.

Said decorative panel, according to a further or another embodiment, may comprise a primer layer, wherein said primer layer is located between said top layer and said top coating. The primer layer may herein improve adhesion and/or binding between the top coating and the top layer, and/or may render the decorative panel of the invention more durable.

According to some embodiments, said primer layer com-prises a polymeric material. By preference said polymeric material is chosen from the group of acrylates or polyure-thanes. According to some embodiments, said primer layer may be present in an amount of between 3 and 15 g/m$^2$. By preference, said primer layer may be present in an amount of between 5 and 10 g/m$^2$.

Said decorative panel, according to a further or another embodiment, may comprise a staining lacquer layer, wherein said staining lacquer layer is located between said top layer and said top coating or, if present, between said primer layer and said top coating. Said staining lacquer layer may provide the decorative panel of the invention with a particular visual effect, wherein certain regions of the deco-rative panel are colored and/or highlighted. Decorative pan-els may generally comprise a decorative print imitating for example wood or stone, which decorative print may be part of the top layer. By coloring and/or highlighting particular regions of the decorative panel on a higher level, particular visual effects may be obtained.

By preference, said staining lacquer layer comprises a polymeric material. More by preference, said polymeric material is chosen from the group of polyester acrylates, polyether acrylates, epoxy acrylates, silicone acrylates, polyurethane acrylates, or a combination thereof. According to some embodiments, the staining lacquer layer may com-prise colored pigments, dyes, metallic pigments, pearlescent pigments, matting agents, or combinations thereof.

According to further or another embodiment, said top layer comprises at least a decoration layer and a wear layer, wherein said wear layer is provided onto said decoration layer. According to some embodiments, the decoration layer is a thermoplastic decoration layer. Preferably, said thermo-plastic decoration layer is a thermoplastic decorative film, said thermoplastic decoration layer comprising a print pro-vided on said film. According to some embodiments, the wear layer is a transparent and/or translucent thermoplastic wear layer. Preferably, said transparent and/or translucent thermoplastic wear layer is a thermoplastic film.

The thermoplastic material of said decoration layer and/or wear layer may be chosen from the group of polypropylene (PP), polyethylene (PE), polyethylene terephthalate (PET), polyvinyl chloride (PVC), or combinations thereof. By preference, said thermoplastic material is polyvinyl chloride (PVC).

According to a further or another embodiment, at least the wear layer comprises a decorative relief, which decorative relief is preferably formed by embossing at least said wear layer. More by preference, said decorative relief may cor-respond to the texture of a natural material such as natural stone or wood.

According to a further or another embodiment, said substrate comprises a thermoplastic material. The thermo-plastic material of the substrate may be chosen from the group of polypropylene (PP), polyethylene (PE), polyethyl-ene terephthalate (PET), polyvinyl chloride (PVC), or combinations thereof. By preference, said thermoplastic material is polyvinyl chloride (PVC). Preferably, the thermoplastic material of said substrate, said decoration layer and said wear layer are the same, for example all polyvinyl chloride (PVC).

According to some embodiments, said substrate comprises more than 40% by weight of a filler material. By preference, said substrate comprises between 65 and 85% by weight of filler material. According to some embodiments, said filler material may be chosen from chalk and/or limestone and/or talcum and/or calcium carbonate.

In accordance with the present invention the substrate may be single-layered or may be comprising a plurality of substrate layers, preferably an uneven number of substrate layers. The substrate, whether single-layered or multi-layered, preferably forms at least half the thickness and/or half the weight of said decorative panel and/or is at least available at a central location within the thickness of said decorative panel.

The decorative panel of the invention preferably has a total thickness between 2 and 8 mm, and even better between 3 and 6 mm. The substrate, whether multi-layered or single layered, preferably has a thickness between 2 mm and 5 mm.

The decorative panel of any of the aspects mentioned above may be provided on at least two opposite edges with coupling parts, allowing that two such panels at the respective edges can be coupled to each other, wherein, in the coupled condition, a locking is obtained in a vertical direction perpendicular to the plane of coupled panels, and in a horizontal direction in the plane of coupled panels and perpendicular to said edges.

Preferably, the coupling parts are basically formed as a tongue and groove with locking means. For example such coupling parts as described in WO 97/47834 or WO 2011/077311. The coupling parts and locking means preferably show one or more of the following properties:

The property that said coupling parts and locking means are formed in one piece with the material of said decorative panel. Preferably, the respective edge is formed for at least 70% of its contour, as seen in a cross-section in a plane perpendicular to said edge, out of said substrate, preferably out of said thermoplastic material, as the case may be.

The property that said groove has a lower and an upper groove lip, wherein the lower groove lip preferably extends beyond said upper groove lip. Preferably, said locking means comprise a protrusion formed on the upper side of said lower groove lip, and an excavation at the bottom of said tongue.

The property that the lower side of the upper groove lip and/or the upper side of the lower groove lip is entirely formed in said substrate. The lower side of the upper groove lip and/or the upper side of said lower groove lip are preferably entirely formed from said thermoplastic material, as the case may be.

The property that said substrate is a an extruded thermoplastic material, wherein said horizontal direction coincides with the extrusion direction, wherein said panel is rectangular and oblong, and said coupling parts are preferably available at the pair of longitudinal edges. As an alternative said coupling parts are available at the pair of short edges, and/or at both pairs of edges.

A second independent aspect of the present invention concerns a method for manufacturing decorative panels, comprising at least the following steps:

the step of providing a substrate, the step of providing a top layer onto said substrate, and the step of providing a top coating above said top layer, wherein said method comprises the step of forming a randomized relief onto the uppermost surface of said top coating.

It is clear that the method of the second independent aspect is ideally suited for manufacturing the panels of the first independent aspect.

The method of the invention may have one or more advantages over what is known in that the randomized relief provides the obtained panel with a more natural and/or authentic look and feel. More in particular, the obtained panel may have a less synthetic appearance in comparison to the panels as known in the art, and/or may look of higher quality.

It is noted that the steps of providing a substrate, of providing a top layer onto said substrate, and of providing a top coating above said top layer, may be performed in consecutive order. Alternatively, it may also be possible that the top coating is first provided above the top layer, forming a coated top layer, which, subsequently, is brought onto the substrate.

By preference, said step of forming said randomized relief onto the uppermost surface of said top coating comprises photocuring the top coating, preferably at a wavelength of below 242 nm. Photocuring, particularly in the wavelength range as described herein, may allow a substantially shallow and/or superficial curing of the uppermost surface of the top coating, resulting in a thin polymerized skin which will fold and/or shrink in order to reduce tension. More by preference, photocuring the top coating is performed at a wavelength of between 152 and 242 nm. Even more by preference, photocuring the top coating is performed at a wavelength of 172 nm or 222 nm.

According to some embodiments, said step of forming said randomized relief onto the uppermost surface of said top coating comprises photocuring the top coating by means of a Xenon (Xe) lamp. By preference, said Xenon (Xe) lamp is used at a curing power of between 2 to 20 W/cm of top coating surface.

According to a further or another embodiment, photocuring the top coating at a wavelength of below 242 nm is performed in the absence of oxygen ($O_2$) or in the presence of less than 200 ppm of oxygen ($O_2$), preferably of less than 50 ppm of oxygen ($O_2$). This has the advantage that photocuring the top coating at a wavelength of below 242 nm may be performed at high efficiency. In the presence of oxygen ($O_2$), irradiation at a wavelength of below 242 nm may give rise to the formation of ozone ($O_3$), which may hinder photocuring the top coating at a wavelength of below 242 nm. According to some embodiments, the absence of oxygen ($O_2$), or a presence of less than 200 ppm of oxygen ($O_2$), may be obtained by overflooding the area of photocuring with an inert gas, such as nitrogen ($N_2$) gas.

According to a further or another embodiment, said step of forming said randomized relief onto the uppermost surface of said top coating comprises photocuring the top coating at a wavelength of between 242 nm and 310 nm. Photocuring in the wavelength range as described herein may allow a substantially shallow and/or superficial curing of the uppermost surface of the top coating, resulting in a thin polymerized skin which will fold and/or shrink in order to reduce tension. More by preference, photocuring the top coating is performed at a wavelength of 254 nm or 308 nm. A Xenon (Xe) lamp, preferably used at a curing power of between 2 to 20 W/cm of top coating surface, may be used.

According to a further or another embodiment, photocuring the top coating at a wavelength of between 242 nm and 310 nm is performed in the presence of more than 200 ppm of oxygen ($O_2$). In the wavelength range as described, there may be no substantial risk of ozone ($O_3$) creation, hence it may not be needed to photocure the top coating in an oxygen depleted environment. As a result, the method of the invention may be made more cost-efficient as for example no overflooding with an inert gas such as nitrogen ($N_2$) gas need be provided. As a kind of safety measure, it may be possible to provide doped quartz glass, which may prevent transmission of wavelengths below 200 nm, in particular of 185 nm.

Said top coating, according to a further or another embodiment, forms a polymeric material, preferably chosen from the group of polyester acrylates, polyether acrylates, epoxy acrylates, silicone acrylates, polyurethane acrylates, or a combination thereof.

According to a further or another embodiment, said top coating is free of matting agents or comprises less than 4% of matting agents. The method of the invention may thus provide a decorative panel which may have an uppermost surface, in particular the uppermost surface of the top coating, which has a less glossy and/or shiny appearance, and/or which has a softer feel, without the need for including matting agents in the top coating. According to some embodiments, if present in an amount of less than 4%, said matting agent may be chosen from the group of silica powder, wax powder, polyimide powder, or combinations thereof.

Said top coating, according to some embodiments, comprises wear resistant particles. Said wear resistant particles may contribute in making the uppermost surface of the panel, in particular the uppermost surface of the top coating better wear resistant and/or durable. By preference, said wear resistant particles may be chosen from the group of aluminum oxide particles, silicon carbide particles, silicon oxide particles, diamond particles, or combinations thereof.

The step of providing a top coating above said top layer, according to a further or another embodiment, may comprise applying said top coating in an amount of between 5 and 30 g/m$^2$. Preferably, said top coating is applied in an amount of between 7 and 15 g/m$^2$. Said top coating may for example be applied by means of a roll coater, a curtain coater, or a spray coater. Said top coating may be applied as a single layer, or may also be applied in two layers, optionally by means of brushing, in order to optimally distribute the top coating on the underlying surface.

According to some embodiments, after performing said step of forming said randomized relief onto the uppermost surface of said top coating, said method comprises the step of post-curing said top coating. By preference, said post-curing may be performed by means of UV post-curing. UV post-curing may be performed by means of a mercury (Hg) doped UV lamp. By preference, said mercury (Hg) doped UV lamp is used at a curing power of between 120 and 160 W/cm of top coating surface, for example at a curing power of about 139 W/cm of top coating surface.

According to some embodiments, before performing said step of forming said randomized relief onto the uppermost surface of said top coating, said method comprises the step of pre-curing said top coating. By preference, said pre-curing may be performed by means of UV pre-curing. UV pre-curing may be performed by means of a mercury (Hg) doped UV lamp, a gallium (Ga) doped UV lamp, an iron (Fe) doped UV lamp, or combinations thereof. By preference, use is being made of an iron (Fe) doped UV lamp. More by preference, said iron (Fe) doped UV lamp is used at a curing power of between 20 and 40 W/cm of top coating surface, for example at a curing power of 33 W/cm. According to some embodiments, curing is performed by means of a mercury (Hg) doped UV lamp, a gallium (Ga) doped UV lamp, an iron (Fe) doped UV lamp, or combinations thereof, set at a pre-cure height of between 250 and 350 mm, for example of 300 mm.

According to some embodiments, before performing the step of providing said top coating above said top layer, said method comprises the step of providing a primer layer above said top layer. The primer layer may herein improve adhesion and/or binding between the top coating and the top layer, and/or may render the decorative panel obtained by the method of the invention more durable.

According to some embodiments, said primer layer forms a polymeric material. By preference said polymeric material is chosen from the group of acrylates or polyurethanes. According to some embodiments, said primer layer may be provided in an amount of between 3 and 15 g/m$^2$. By preference, said primer layer may be provided in an amount of between 5 and 10 g/m$^2$. According to some embodiments, after providing the primer layer, said primer layer may be partly cured by means of UV or heat curing.

According to some embodiments, before performing said step of providing said top coating above said top layer, said method comprises the step of providing a staining lacquer layer above said top layer or, if present, above said primer layer.

By preference, said staining lacquer layer forms a polymeric material. More by preference, said polymeric material is chosen from the group of polyester acrylates, polyether acrylates, epoxy acrylates, silicone acrylates, polyurethane acrylates, or a combination thereof. According to some embodiments, the staining lacquer layer may comprise colored pigments, dyes, metallic pigments, pearlescent pigments, matting agents, or combinations thereof. According to some embodiments, said staining lacquer layer may be provided in an amount of between 3 and 50 g/m$^2$. According to some embodiments, after providing the staining lacquer layer, said staining lacquer layer may be partly cured by means of UV or heat curing.

According to a further or another embodiment, said top layer comprises at least a decoration layer and a wear layer, wherein said wear layer is provided onto said decoration layer. According to some embodiments, the decoration layer is a thermoplastic decoration layer. Preferably, said thermoplastic decoration layer is a thermoplastic decorative film, said thermoplastic decoration layer comprising a print, preferably provided on said film. According to some embodiments, the wear layer is a transparent and/or translucent thermoplastic wear layer. Preferably, said transparent and/or translucent thermoplastic wear layer is a thermoplastic film. More preferably, the wear layer may be a polyvinyl chloride (PVC) film, which even more preferably has a thickness of between 0.1 and 0.8 mm, and even more preferably of between 0.2 and 0.55 mm. Alternatively, the wear layer may be a polypropylene (PP), polyethylene terephthalate (PET) or polyethylene terephthalate glycol (PET-G) film, which preferably has a thickness of between 0.1 and 0.55 mm. Alternatively, the wear layer may also be a UV-cured lacquer layer having a thickness of about 200 μm.

According to a further or another embodiment, at least the wear layer comprises a decorative relief, which decorative relief is preferably formed by embossing at least said wear layer. More by preference, said decorative relief may correspond to the texture of a natural material such as natural stone or wood.

According to some embodiments, said substrate is provided by means of extrusion.

According to a further or another embodiment, said substrate comprises a thermoplastic material. The thermoplastic material of the substrate may be chosen from the group of polypropylene (PP), polyethylene (PE), polyethylene terephthalate (PET), polyvinylchloride (PVC), or combinations thereof. By preference, said thermoplastic material is polyvinylchloride (PVC).

According to some embodiments, said substrate comprises more than 40% by weight of a filler material. By preference, said substrate comprises between 65 and 85% by weight of filler material. According to some embodiments, said filler material may be chosen from chalk and/or limestone and/or talcum and/or calcium carbonate.

According to a further or another embodiment, a decorative panel according to any of the above-mentioned embodiments of the first independent aspect may be obtained as a result of performing said method.

In general, it is remarked that the randomized relief of the first and/or second independent aspect and/or the preferred embodiments thereof may have the power to hide to some extent surface defects on the upper surface of the substrate. This is especially interesting when working with foamed substrate layers and/or with rather thin decoration layers, as the randomized relief may lead to less production of scrap and/or to less surface defects detracting from the natural look the decorative panel aspires to create. Similar problems may arise with substrate that comprise recycled material. Also in such case the randomized relief may limit the risk of unacceptable surface defects.

The invention, in accordance with its first and/or second independent aspect, is thus preferably characterized in that the top layer comprises a decoration layer, wherein said decoration layer comprises a layer formed by inks that are directly applied to said substrate, potentially with the intermediate of one or more primer layers. Such directly printed decoration layers are notoriously thin;

the top layer comprises a decoration layer, wherein said decoration layer comprises a printed thermoplastic film, wherein said thermoplastic film has a thickness of 100 μm or less, preferably of 70 μm or less, and is thermally laminated to said substrate;

said top layer comprises a wear layer applied over a decoration layer, wherein said wear layer has a thickness of less than 1 mm, for example of 0.6 mm or less;

said substrate comprises or consist of a foamed layer of said thermoplastic material, wherein the density of said foamed layer is 1900 kg/m³ or less, preferably 1650 kg/m³ or less; and/or said substrate comprises recycled thermoplastic material from post-industrial and/or post-consumer waste.

BRIEF DESCRIPTION OF THE DRAWINGS

In order to better demonstrate the features of the invention, some preferred embodiments are described below, by way of example and without any limiting character, with reference to the accompanying drawings, wherein.

DETAILED DESCRIPTION OF THE INVENTION

Figure 1:
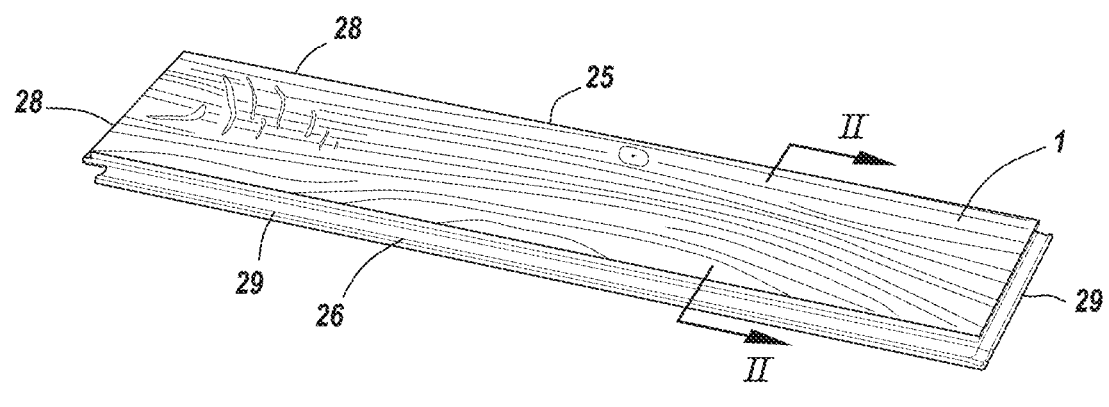
FIG. 1 illustrates a perspective view of a decorative panel in accordance with the first independent aspect of the invention.
Figure 2:
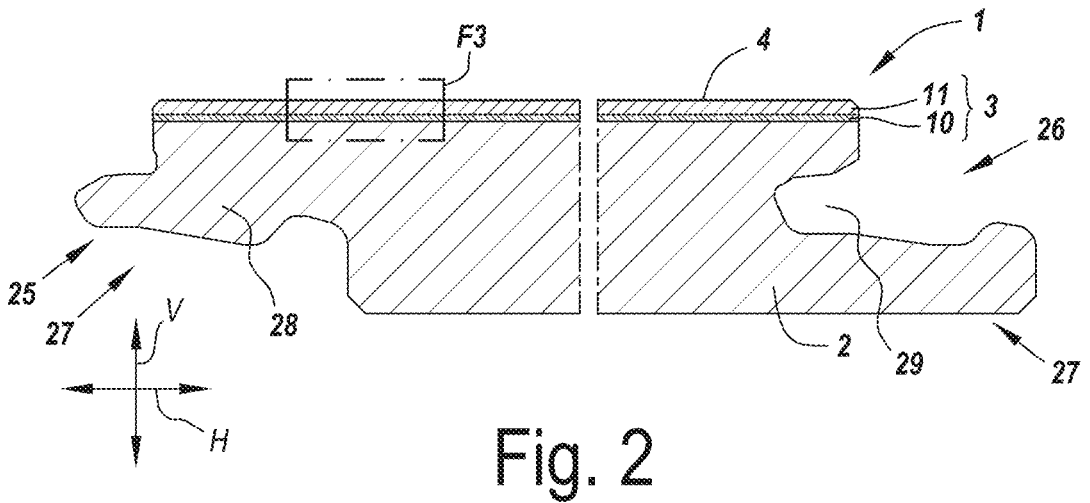
FIG. 2 illustrates a cross-sectional view according to line II-II in FIG. 1.
Figure 3:
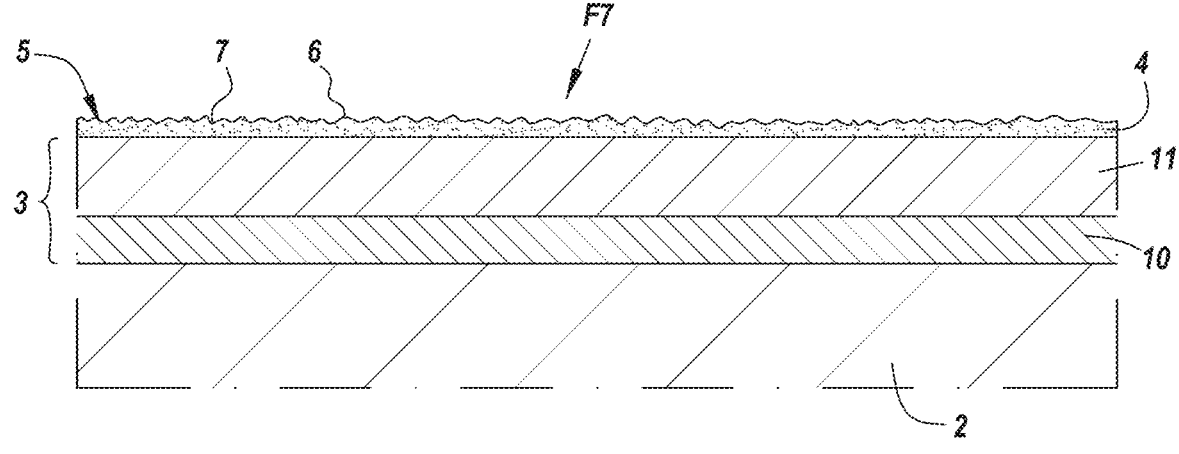
FIG. 3 illustrates a more detailed cross-sectional view according to F3 in FIG. 2, FIGS. 4 and 5 illustrate variants in the same view as in FIG. 3, FIG. 6 schematically illustrates a method for manufacturing a decorative panel in accordance with the second independent aspect of the invention.

FIGS. 1 and 2 show a decorative panel 1 according to the invention, in particular the first independent aspect of the invention, wherein said decorative panel 1 comprises a substrate 2, a top layer 3 and a top coating 4, and wherein the top layer 3 is located between said substrate 2 and said top coating 4. In FIG. 3, a detailed view of this layered buildup is shown. In particular, FIG. 3 shows that the top coating 4 of the decorative panel 1 comprises a randomized relief 5. Said randomized relief 5 comprises a plurality of peaks 6 and valleys 7, wherein the top coating 4 complies with one or more of the following features:

said plurality of peaks 6 and valleys 7 are configured having an average peak-to-peak distance of between 1 and 25 μm, and/or said plurality of peaks 6 and valleys 7 are configured having an average amplitude of between 0.5 and 10 μm; and/or said uppermost surface of said top coating 4 has a gloss degree measured at an angle of 60° of below 6 points, preferably of below 3 points; and/or said top coating 4 has a carbon-carbon double bond conversion degree of more than 80%, preferably of more than 90%.

It is furthermore shown in FIG. 2 that the top layer 3 comprises a decoration layer 10 and a wear layer 11, wherein said wear layer 11 is provided onto said decoration layer 10. The decorative panel 1 is furthermore provided on at least two opposite edges 25-26 with coupling parts 27, allowing that two such panels at the respective edges 25-26 can be coupled to each other, wherein, in the coupled condition, a locking is obtained in a vertical direction (V) perpendicular to the plane of coupled panels 1, and in a horizontal direction (H) in the plane of coupled panels 1 and perpendicular to said edges 25-26. More specifically, a tongue 28 and groove 29 configuration is shown.

Figure 4:
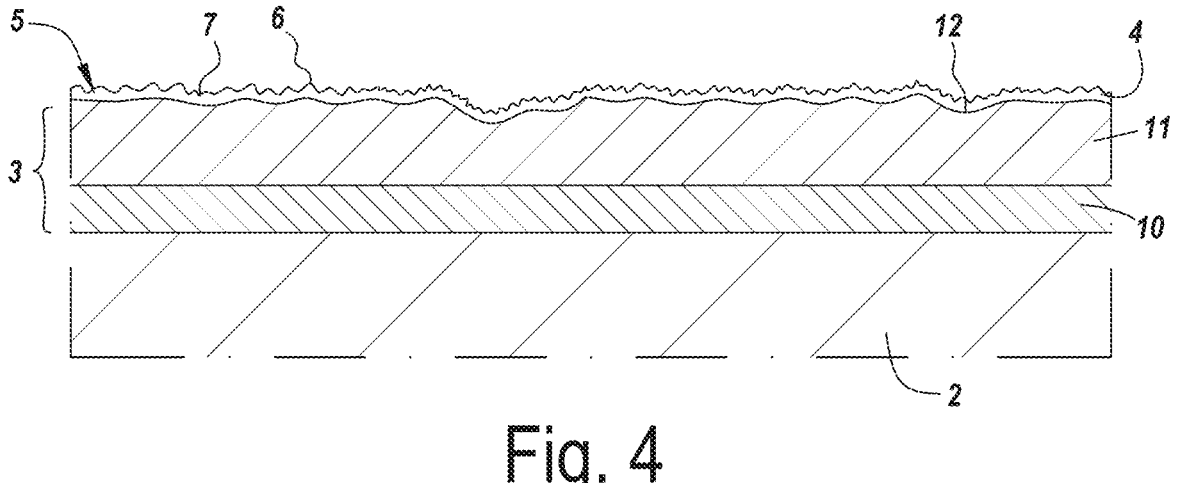
Figure 5:
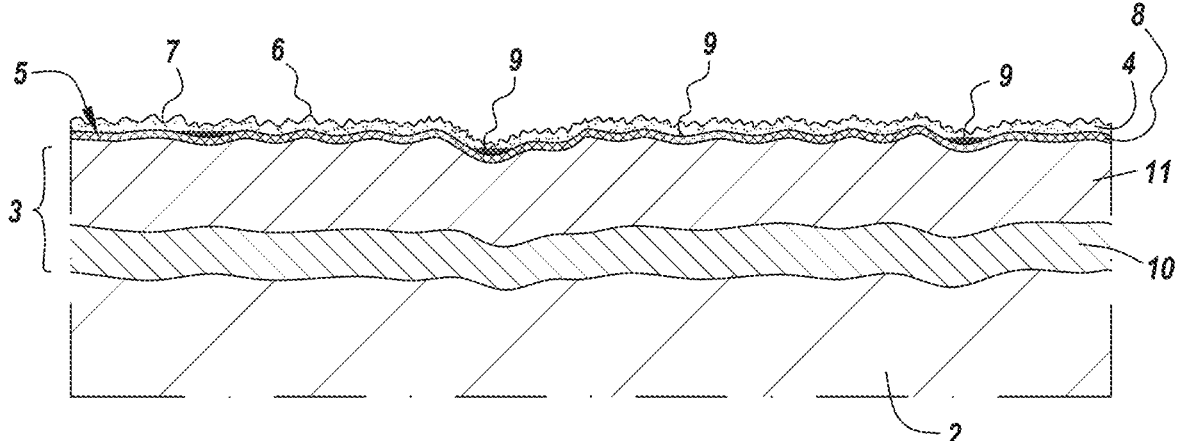

FIGS. 3, 4 and 5 all aim to illustrate several variants or alternatives. In particular, FIG. 3 shows an exemplary buildup of a decorative panel 1 according to the invention, wherein the decorative panel 1 is built from bottom to top including at least: a substrate layer 2, a decoration layer 10 and a wear layer 11, which decoration layer 10 and wear layer 11 together form the top layer 3. The assembly of the substrate 2, the decoration layer 10 and the wear layer 11 is substantially planar and does not comprise an embossed decorative relief. On top, the decorative panel 1 is provided with a top coating 4 which has a randomized relief 5, comprising a plurality of peaks 6 and valleys 7. FIG. 4 shows a variant, wherein the decorative panel 1 is built from bottom to top including at least: a substrate layer 2, a decoration layer 10 and a wear layer 11, which decoration layer 10 and wear layer 11 together form the top layer 3. An embossed decorative relief 12 is present only in the wear layer 11. On top, the decorative panel 1 is provided with a top coating 4 which follows the embossed decorative relief 12 of the underlaying wear layer, and which comprises a randomized relief 5, comprising a plurality of peaks 6 and valleys 7. FIG. 5 shows a variant, wherein the decorative panel 1 is built from bottom to top at least including: a substrate layer 2, a decoration layer 10 and a wear layer 11, which decoration layer 10 and wear layer 11 together form the top layer 3. An embossed decorative relief 12 is present throughout the substrate 2, the decoration layer 10 and the wear layer 11. On top, the decorative panel 1 is provided with from bottom to top with a primer layer 8, a staining lacquer layer 9 and a top coating 4. The primer layer 8 follows the embossed decorative relief 12 and is applied over substantially the entire surface of the wear layer 11. The staining lacquer layer 9 is only applied intermittently, more in particular the staining lacquer layer 9 is applied as such that it fills parts of the embossed decorative relief 12. The top coating comprises a randomized relief 5, comprising a plurality of peaks 6 and valleys 7.

Figure 6:
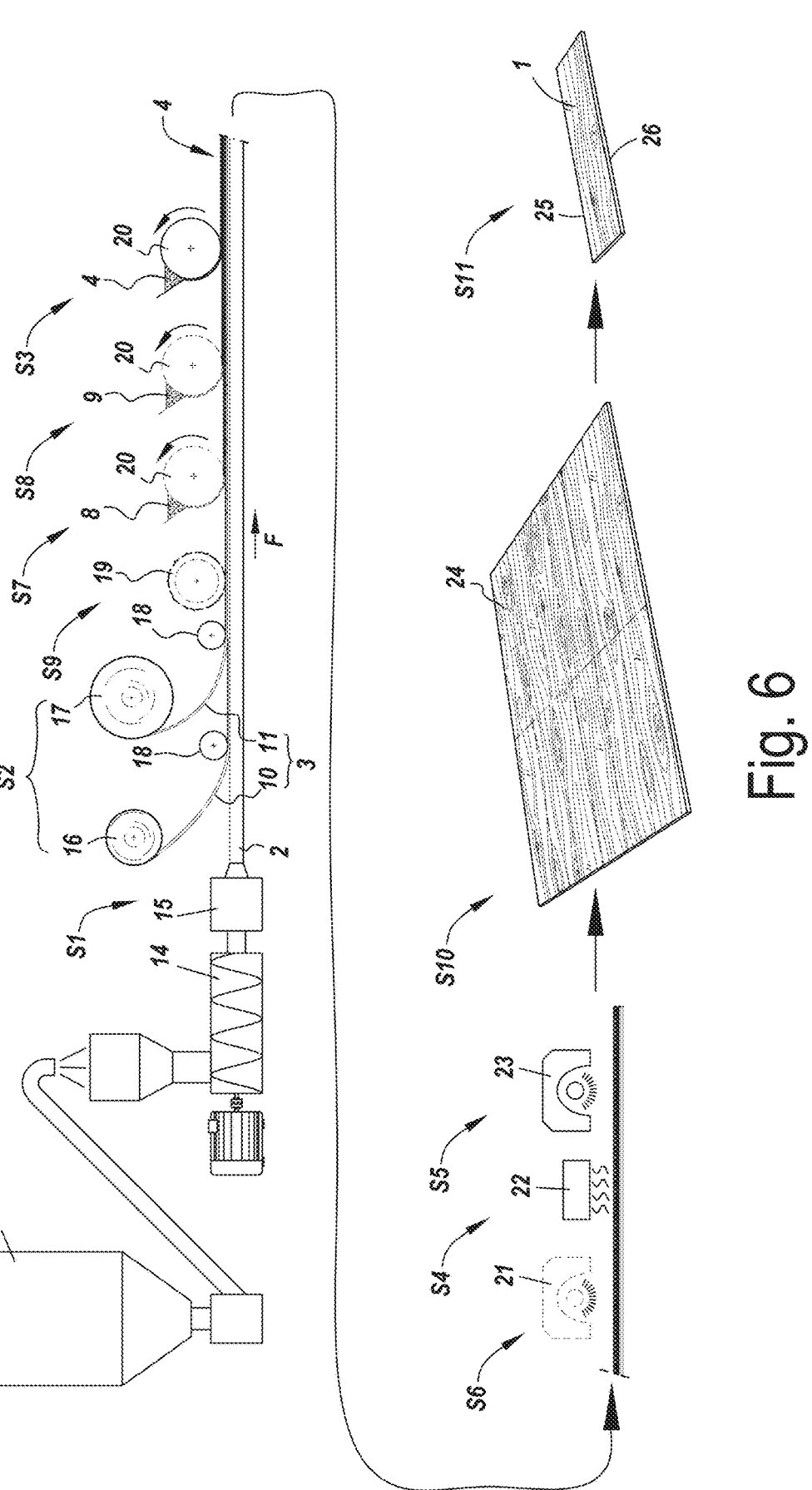

FIG. 6 schematically illustrates a method for manufacturing a decorative panel 1 in accordance with the second independent aspect of the invention, comprising among others the following steps:

the step S1 of providing a substrate 2, the step S2 of providing a top layer 3 onto said substrate 2, the step S3 of providing a top coating 4 above said top layer 3, and the step S4 of forming a randomized relief 5 onto the uppermost surface of said top coating 4.

The step S4 of forming said randomized relief 5 onto the uppermost surface of said top coating 4 comprises photo-curing the top coating 4 at a wavelength of below 242 nm, in particular at 172 nm, which is performed in the presence of less than 200 ppm of oxygen ($O_2$). Step S4 is performed by means of a Xenon (Xe) lamp 22, which is operated at a curing power of between 2 to 20 W/cm of top coating surface. The step S3 of providing the top coating 4 above said top layer 3, comprises applying said top coating 4 in an amount of between 5 and 30 $g/m^2$, which is performed by means of a roll coater 20. A randomized relief 5 is obtained comprising peaks 6 and valleys 7, complying with one or more of the following characteristics:

said plurality of peaks 6 and valleys 7 are configured having an average peak-to-peak distance of between 1 and 25 μm, and/or said plurality of peaks 6 and valleys 7 are configured having an average amplitude of between 0.5 and 10 μm.

After performing said step S4 of forming said randomized relief 5 onto the uppermost surface of said top coating 4, said method comprises the step S5 of post-curing said top coating, which is performed by a mercury (Hg) doped UV lamp 23, which is operated at a curing power of between 120 and 160 W/cm of top coating surface.

Optionally, before performing said step S4 of forming said randomized relief 5 onto the uppermost surface of said top coating 4, said method comprises the step S6 of pre-curing said top coating 4 by means of an iron (Fe) doped UV lamp 21. Said iron (Fe) doped UV lamp 21 is used at a curing power of between 20 and 40 W/cm of top coating surface, at a pre-cure height of between 250 and 350 mm. In the presence of said optional step S6, a smaller wrinkling effect may be favored, such that the randomized relief 5 obtained, complies with one or more of the following features:

said plurality of peaks 6 and valleys 7 are configured having an average peak-to-peak distance of between 1 and 10 μm, and/or said plurality of peaks 6 and valleys 7 are configured having an average amplitude of between 0.5 and 2.5 μm.

Optionally, before performing step S3 of providing said top coating 4 above said top layer 3, said method comprises the step S7 of providing a primer layer 8 above said top layer 3. The primer layer is applied in an amount of between 3 and 15 $g/m^2$, for example by means of a roll coater 20.

Optionally, before performing step S3 of providing said top coating 4 above said top layer 3, said method comprises the step S8 of providing a staining lacquer layer 9 above said top layer 3 or, if present, above said primer layer 8. The staining lacquer layer 9 is applied in an amount of between 3 and 50 $g/m^2$, for example by means of a roll coater 20.

It is furthermore shown that the top layer 3 comprises a decoration layer 10 and a wear layer 11, wherein said wear layer 11 is provided onto said decoration layer 10. The decoration layer 10 and the wear layer 11 are provided from the respective supply rolls 16 and 17 in step S2, and are laminated onto the substrate 2 by means of two lamination rollers 18. Alternatively, although not explicitly shown, the decoration layer 10 and the wear layer 11 may also be laminated together by means of a single lamination roller. The step S1 of providing the substrate material 1 may be performed by an extrusion operation, which comprises a feed 13 for feeding raw material for the substrate material 2 to the extruder 14. The raw material is extruded through a so-called flat die or slot die 15 into a, preferably flat, substrate material, for example having a width of 1 to 2.1 meter, preferably about 1.3 meter and a thickness of 2 to 7 mm, by preference of 3 to 6 mm, more by preference of 3 to 5 mm, even more by preference of 3.5 to 4.5 mm. It is furthermore shown in FIG. 6 that the resulting material, in step S10, may be further divided into slabs 23 comprising a plurality of decorative panels 1 and/or, in step S11, may be consequently divided into decorative panels 1. In a subsequent step, these decorative panels 1 may be further provided with coupling means. Optionally, at least the wear layer 11 may be embossed in step S9, by means of a mechanical embossing operation, such as by means of an embossing roller 19.

Figures 7, 8:
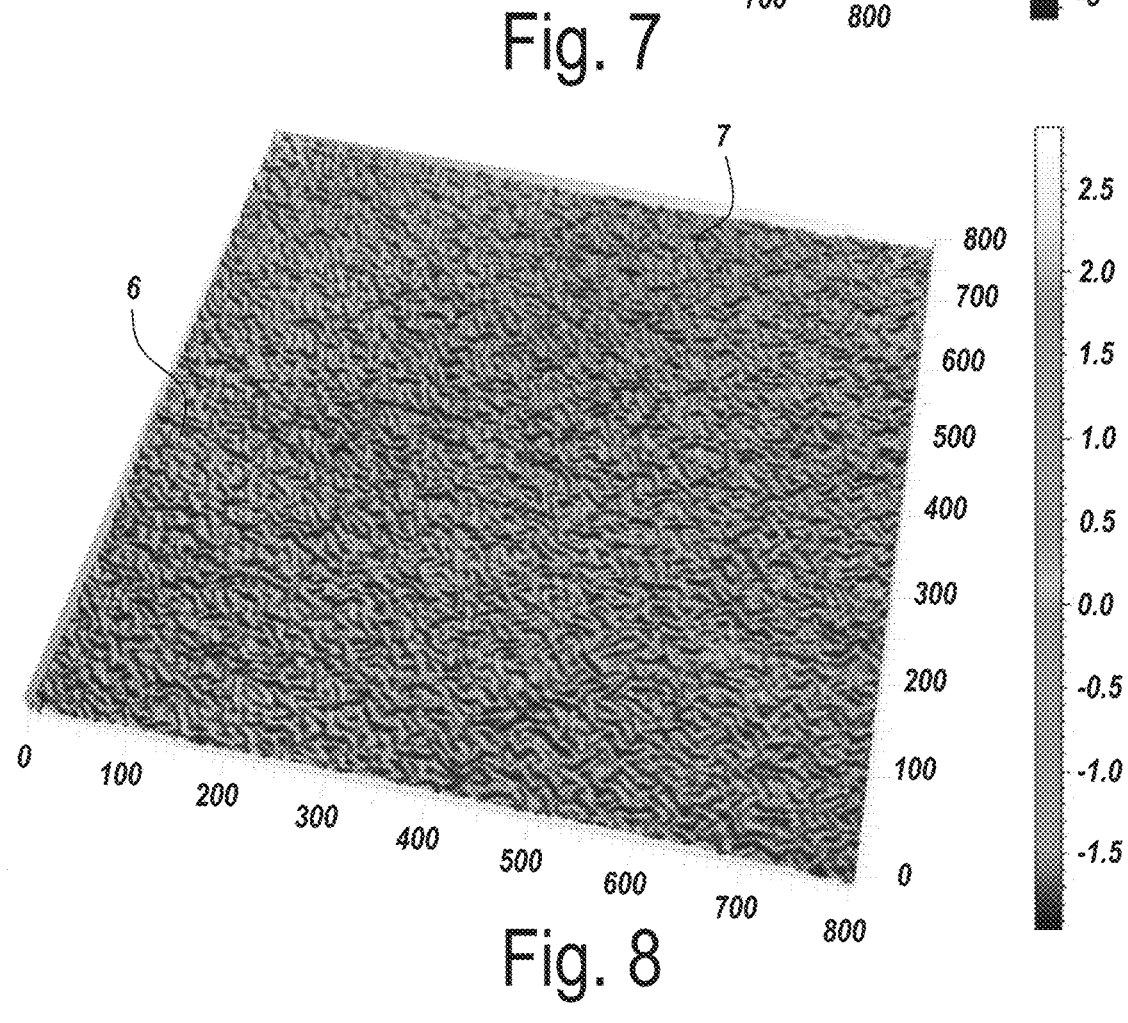
FIG. 7 shows a confocal microscopy image of the area of the uppermost surface of the decorative panel of FIG. 3, as indicated with the arrow F7, the randomized relief being in accordance with the first independent aspect of the invention.
FIG. 8 shows a confocal microscopy image of a variant in the same view as in FIG. 7.

FIG. 7 shows a confocal microscopy image of a randomized relief in accordance with the invention. The confocal microscopy image has been obtained in accordance with ISO 25178-2:2021. The axes show values in micrometer, and the grayscale also shows the distance in micrometer between the relief features and the least squares fitted plane. Negative values illustrate valleys 6 with a surface below said least squares fitted plane, while positive values illustrate peaks 7 with a surface above said least squares fitted plane. FIG. 7 thus aims to illustrate the uppermost surface of the decorative panel, which comprises a randomized relief 5 comprising peaks 6 and valleys 7, and which may comply with one or more of the following characteristics:

said plurality of peaks 6 and valleys 7 are configured having an average peak-to-peak distance of between 1 and 25 μm, and/or said plurality of peaks 6 and valleys 7 are configured having an average amplitude of between 0.5 and 10 μm.

FIG. 8 shows a confocal microscopy image of a variant in the same view as in FIG. 7, as obtained in accordance with ISO 25178-2:2021. The axes show values in micrometer, and the grayscale also shows the distance in micrometer between the relief features and the least squares fitted plane. Negative values illustrate valleys 6 with a surface below said least squares fitted plane, while positive values illustrate peaks 7 with a surface above said least squares fitted plane.

FIG. 8 thus aims to illustrate the uppermost surface of the decorative panel, which comprises a randomized relief 5 comprising peaks 6 and valleys 7, and which may comply with one or more of the following characteristics:

said plurality of peaks 6 and valleys 7 are configured having an average peak-to-peak distance of between 1 and 10 µm, and/or said plurality of peaks 6 and valleys 7 are configured having an average amplitude of between 0.5 and 2.5 µm.

The present disclosure further concerns aspects and embodiments as defined by the following numbered paragraphs:

1.—Decorative panel comprising a substrate 2, a top layer 3 and a top coating 4, wherein said top layer is located between said substrate and said top coating, characterized in that, the uppermost surface of said top coating comprises a randomized relief 5.

2.—Decorative panel according to numbered paragraph 1, characterized in that, said randomized relief 5 comprises a plurality of peaks 6 and valleys 7.

3.—Decorative panel according to numbered paragraph 2, characterized in that, said plurality of peaks 6 and valleys 7 are configured having an average peak-to-peak distance of between 1 and 25 µm.

4.—Decorative panel according to numbered paragraph 2 or 3, characterized in that, said plurality of peaks 6 and valleys 7 are configured having an average amplitude of between 0.5 and 10 µm.

5.—Decorative panel according to any one of numbered paragraphs 3 or 4, characterized in that, said plurality of peaks 6 and valleys 7 are configured having an average peak-to-peak distance of between 1 and 10 µm.

6.—Decorative panel according to numbered paragraph 4 or 5, characterized in that, said plurality of peaks 6 and valleys 7 are configured having an average amplitude of between 0.5 and 2.5 µm.

7.—Decorative panel according to any one of numbered paragraphs 1-6, characterized in that, said uppermost surface of said top coating 4 has a gloss degree measured at an angle of 60° of below 6 points, preferably of below 3 points.

8.—Decorative panel according to any one of numbered paragraphs 1-7, characterized in that, said uppermost surface of said top coating 4 has a gloss degree measured at an angle of 85° of below 12 points, preferably of below 8 points.

9.—Decorative panel according to any one of numbered paragraphs 1-8, characterized in that, said top coating 4 has a carbon-carbon double bond conversion degree of more than 80%, preferably of more than 90%.

10.—Decorative panel according to any one of numbered paragraphs 1-9, characterized in that, said top coating 4 comprises a polymeric material, preferably chosen from the group of polyester acrylates, polyether acrylates, epoxy acrylates, silicone acrylates, polyurethane acrylates, or a combination thereof.

11.—Decorative panel according any one of numbered paragraphs 1-10, characterized in that, said top coating is free of matting agents or comprises less than 4% of matting agents.

12.—Decorative panel according to numbered paragraph 11, characterized in that, the matting agent, if present, is chosen from the group of silica powder, wax powder, polyimide powder, or combinations thereof.

13.—Decorative panel according to any one of numbered paragraphs 1-12, characterized in that, said top coating

4 comprises wear resistant particles, preferably chosen from the group of aluminum oxide particles, silicon carbide particles, silicon oxide particles, diamond particles, or combinations thereof.

14.—Decorative panel according to any one of numbered paragraphs 1-13, characterized in that, said top coating 4 is present in an amount of between 5 and 30 g/m².

15.—Decorative panel according to any one of numbered paragraphs 1-14, characterized in that, said decorative panel comprises a primer layer 8, wherein said primer layer is located between said top layer 3 and said top coating 4.

16.—Decorative panel according to numbered paragraph 15, characterized in that, said primer layer 8 comprises a polymeric material, preferably chosen from the group of acrylates or polyurethanes.

17.—Decorative panel according to numbered paragraph 15 or 16, characterized in that, said primer layer 8 is present in an amount of between 3 and 15 g/m², preferably of between 5 and 10 g/m².

18—Decorative panel according to any one of numbered paragraphs 1-17, characterized in that, said decorative panel comprises a staining lacquer layer 9, wherein said staining lacquer layer is located between said top layer 3 and said top coating 4 or, if present, between said primer layer 8 and said top coating 4.

19.—Decorative panel according to numbered paragraph 18, characterized in that, said staining lacquer layer 9 comprises colored pigments, dyes, metallic pigments, pearlescent pigments, matting agents, or combinations thereof.

20.—Decorative panel according to any one of numbered paragraphs 1-19, characterized in that, said top layer 3 comprises at least a decoration layer 10 and a wear layer 11, wherein said wear layer is provided onto said decoration layer.

21.—Decorative panel according to any one of numbered paragraphs 20, characterized in that, at least the wear layer 11 comprises a decorative relief 12, which decorative relief is preferably formed by embossing at least said wear layer.

22.—Decorative panel according to any one of preceding numbered paragraphs 1-21, characterized in that, said substrate 2 comprises a thermoplastic material, preferably polyvinylchloride.

23.—Decorative panel according to numbered paragraph 22, characterized in that, said substrate 2 comprises more than 40% by weight of a filler material, preferably between 65 and 85% by weight.

24.—Method for manufacturing decorative panels, comprising at least the following steps:

the step S1 of providing a substrate 2, the step S2 of providing a top layer 3 onto said substrate, and the step S3 of providing a top coating 4 above said top layer, characterized in that, said method comprises the step S4 of forming a randomized relief 5 onto the uppermost surface of said top coating.

25.—Method according to numbered paragraph 24, characterized in that, said step S4 of forming said randomized relief 5 onto the uppermost surface of said top coating 4 comprises photocuring the top coating 4 at a wavelength of below 242 nm, preferably at a wavelength of between 152 and 242 nm, more preferably at a wavelength of 172 nm or 222 nm.

26.—Method according to numbered paragraph 25, characterized in that, photocuring the top coating 4 at a wavelength of below 242 nm is performed in the absence of oxygen ($O_2$) or in the presence of less than 200 ppm of oxygen ($O_2$).

27.—Method according to numbered paragraph 24, characterized in that, said step S4 of forming said randomized relief 5 onto the uppermost surface of said top coating 4 comprises photocuring the top coating 4 at a wavelength of between 242 nm and 310 nm, preferably at a wavelength of 254 nm or 308 nm.

28.—Method according to numbered paragraph 27, characterized in that, photocuring the top coating 4 at a wavelength of between 242 nm and 310 nm is performed in the presence of more than 200 ppm of oxygen ($O_2$).

29.—Method according to any one of numbered paragraphs 24-28, characterized in that, said top coating 4 forms a polymeric material, preferably chosen from the group of polyester acrylates, polyether acrylates, epoxy acrylates, silicone acrylates, polyurethane acrylates, or a combination thereof.

30.—Method according to any one of numbered paragraphs 24-29, characterized in that, said top coating 4 is free of matting agents or comprises less than 4% of matting agents.

31.—Method according to numbered paragraph 30, characterized in that, the matting agent, if present, is chosen from the group of silica powder, wax powder, polyimide powder, or combinations thereof.

32.—Method according to any one of numbered paragraphs 24-31, characterized in that, said top coating 4 comprises wear resistant particles, preferably chosen from the group of aluminum oxide particles, silicon carbide particles, silicon oxide particles, diamond particles, or combinations thereof.

33.—Method according to any one of numbered paragraphs 24-32, characterized in that, the step of S3 providing a top coating 4 above said top layer 3, comprises applying said top coating in an amount of between 5 and 30 g/m².

34.—Method according to any one of numbered paragraphs 24-33, characterized in that, after performing said step S4 of forming said randomized relief 5 onto the uppermost surface of said top coating 4, said method comprises the step of S5 post-curing said top coating, preferably by means of UV curing, more preferably by means of Hg-UV curing.

35.—Method according to any one of numbered paragraphs 24-34, characterized in that, before performing said step S4 of forming said randomized relief 5 onto the uppermost surface of said top coating 4, said method comprises the step S6 of pre-curing said top coating, preferably by means of UV curing, more preferably by means of Hg-, Ga-, or Fe-UV curing.

36.—Method according to any one of numbered paragraphs 24-35, characterized in that, before performing step S3 of providing said top coating 4 above said top layer 3, said method comprises the step S7 of providing a primer layer 8 above said top layer.

37.—Method according to numbered paragraph 36, characterized in that, said primer layer 8 forms a polymeric material, preferably chosen from the group of acrylates or polyurethanes.

38.—Method according to numbered paragraph 36 or 37, characterized in that, the step S7 of providing a primer layer 8 above said top layer 3 comprises applying said primer layer in an amount of between 3 and 15 g/m², preferably of between 5 and 10 g/m².

39.—Method according to any one of numbered paragraphs 24-38, characterized in that, before performing step S3 of providing said top coating 4 above said top layer 3, said method comprises the step S8 of providing a staining lacquer layer 9 above said top layer or, if present, above said primer layer 8.

40.—Method according to numbered paragraph 39, characterized in that, said staining lacquer layer 9 comprises colored pigments, dyes, metallic pigments, pearlescent pigments, matting agents, or combinations thereof.

41.—Method according to any one of numbered paragraphs 24-40, characterized in that, said top layer 3 comprises at least a decoration layer 10 and a wear layer 11, wherein said wear layer is provided onto said decoration layer.

42.—Method according to numbered paragraph 41, characterized in that, at least the wear layer 11 comprises a decorative relief 12, which decorative relief is preferably formed by embossing at least said wear layer.

43.—Method according to any one of preceding numbered paragraphs 24-42, characterized in that, said substrate 2 is provided by means of extrusion.

44.—Method according to any one of numbered paragraphs 24-43, characterized in that, said substrate 2 comprises a thermoplastic material, preferably polyvinylchloride.

45.—Method according to any one of numbered paragraphs 24-44, characterized in that, said substrate 2 comprises more than 40% by weight of a filler material, preferably between 65 and 85% by weight.

46.—Method, or decorative panel as the case may be, according to any of the preceding numbered paragraphs, characterized in that the top layer comprises a decoration layer, wherein said decoration layer comprises a layer formed by inks that are directly applied to said substrate, potentially with the intermediate of one or more primer layers. Such directly printed decoration layers are notoriously thin;

the top layer comprises a decoration layer, wherein said decoration layer comprises a printed thermoplastic film, wherein said thermoplastic film has a thickness of 100 µm or less, preferably of 70 µm or less, and is thermally laminated to said substrate;

said top layer comprises a wear layer applied over a decoration layer, wherein said wear layer has a thickness of less than 1 mm, for example of 0.6 mm or less; and/or said substrate comprises or consist of a foamed layer of said thermoplastic material, wherein the density of said foamed layer is 1900 kg/m³ or less, preferably 1650 kg/m³ or less.

47.—Method according to any one of numbered paragraphs 24-46, characterized in that, a decorative panel 1 according to any one of numbered paragraphs 1-23 is obtained.

The aspects and concepts disclosed in the claims and drawings may be combined with one another as long as they are not mutually contradictory. The present invention is by no means limited to the embodiments described above, however a decorative panel may be realized according to various variants without departing from the scope of the present invention.

The invention claimed is:

1. A decorative panel comprising a substrate, a top layer and a top coating, wherein said top layer is located between said substrate and said top coating, the uppermost surface of said top coating comprising a randomized relief;
  wherein said top coating is present in an amount of between 5 and 30 $g/m^2$.

2. The decorative panel of claim 1, wherein said randomized relief comprises a plurality of peaks and valleys having an average peak-to-peak distance of between 1 and 25 μm and/or having an average amplitude of between 0.5 and 10 μm.

3. The decorative panel of claim 1, wherein said uppermost surface of said top coating has a gloss degree measured at an angle of 60° of below 6 points.

4. The decorative panel of claim 1, wherein said top coating has a carbon-carbon double bond conversion degree of more than 80%.

5. The decorative panel of claim 1, wherein said top coating comprises a polymeric material, chosen from the group of polyester acrylates, polyether acrylates, epoxy acrylates, silicone acrylates, polyurethane acrylates, or a combination thereof.

6. The decorative panel of claim 1, wherein said top coating is free of matting agents or comprises less than 4% of matting agents.

7. The decorative panel of claim 1, wherein said top coating comprises wear resistant particles, chosen from the group of aluminum oxide particles, silicon carbide particles, silicon oxide particles, diamond particles, or combinations thereof.

8. The decorative panel of claim 1, wherein said top layer comprises at least a decoration layer and a wear layer, wherein said wear layer is provided onto said decoration layer.

9. The decorative panel of claim 8, wherein at least the wear layer comprises a decorative relief, which decorative relief is formed by embossing at least said wear layer.

10. The decorative panel of claim 8, wherein said top layer shows one or a combination of two or more of the following properties:
  said decoration layer comprises a layer formed by inks that are directly applied to said substrate, potentially with the intermediate of one or more primer layers;
  said decoration layer comprises a printed thermoplastic film, wherein said thermoplastic film has a thickness of 100 μm or less, and is thermally laminated to said substrate; and/or
  said wear layer has a thickness of less than 1 mm or less.

11. The decorative panel of claim 1, wherein said substrate comprises polyvinylchloride, and wherein said substrate comprises more than 40% by weight of a filler material.

12. The decorative panel of claim 10, wherein said substrate comprises or consist of a foamed layer of said thermoplastic material, wherein the density of said foamed layer is 1,900 $kg/m^3$ or less.

13. A method for manufacturing decorative panels, comprising at least the following steps:
  the step of providing a substrate,
  the step of providing a top layer onto said substrate, and
  the step of providing a top coating above said top layer,
    wherein said top coating is applied in an amount between 5 and 30 $g/m^2$,
  wherein said method comprises the step of forming a randomized relief onto the uppermost surface of said top coating.

14. The method of claim 12, wherein said step of forming said randomized relief onto the uppermost surface of said top coating comprises photocuring the top coating at a wavelength of below 242 nm.

15. A decorative panel comprising a substrate, a top layer and a top coating, wherein said top layer is located between said substrate and said top coating, wherein said top layer comprises at least a decoration layer and a wear layer;
  wherein said decoration layer comprises a layer formed by inks that are applied to said substrate with the intermediate of one or more primer layers, or wherein said decoration layer comprises a printed thermoplastic film, wherein said thermoplastic film has a thickness of 100 μm or less, and is thermally laminated to said substrate;
  wherein said wear layer is provided onto said decoration layer, has a thickness of less than 1 mm, and comprises a decorative relief, which decorative relief is formed by embossing at least said wear layer;
  wherein said top coating is present in an amount of between 5 and 30 $g/m^2$ and wherein the uppermost surface of said top coating comprises a randomized relief, wherein said randomized relief comprises a plurality of peaks and valleys, wherein said plurality of peaks and valleys have an average amplitude of between 0.5 and 2.5 μm.

16. The decorative panel of claim 15, wherein said uppermost surface of said top coating has a gloss degree measured at an angle of 60° of below 6 points.

17. The decorative panel of claim 15, wherein said top coating comprises a polymeric material chosen from the group of polyester acrylates, polyether acrylates, epoxy acrylates, silicone acrylates, polyurethane acrylates, or a combination thereof.

18. The decorative panel of claim 15, wherein said substrate comprises a polyvinylchloride, and in that, said substrate comprises more than 65% by weight of a filler material.

\* \* \* \* \*